July 14, 1931.  W. S. FINNELL  1,814,623
RUBBER TIRED WHEEL
Filed Sept. 2, 1927
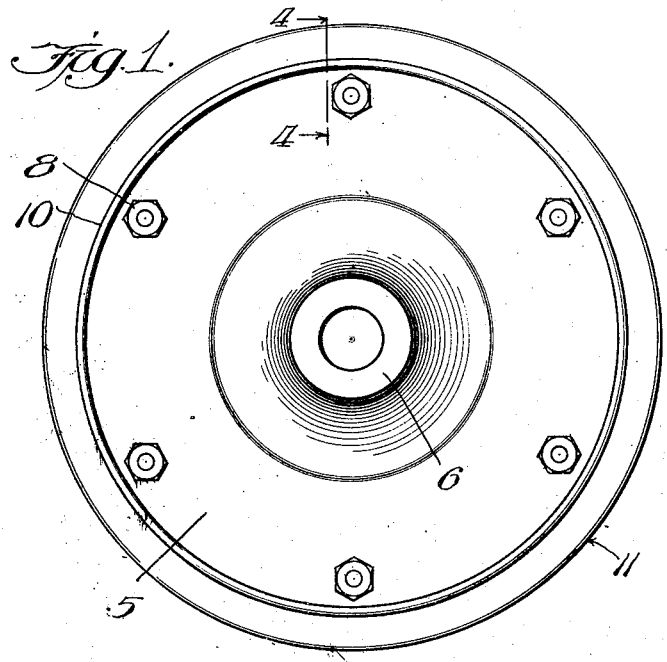
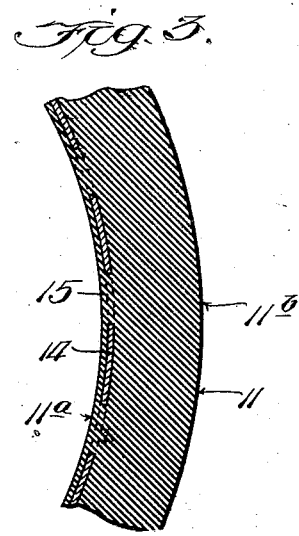
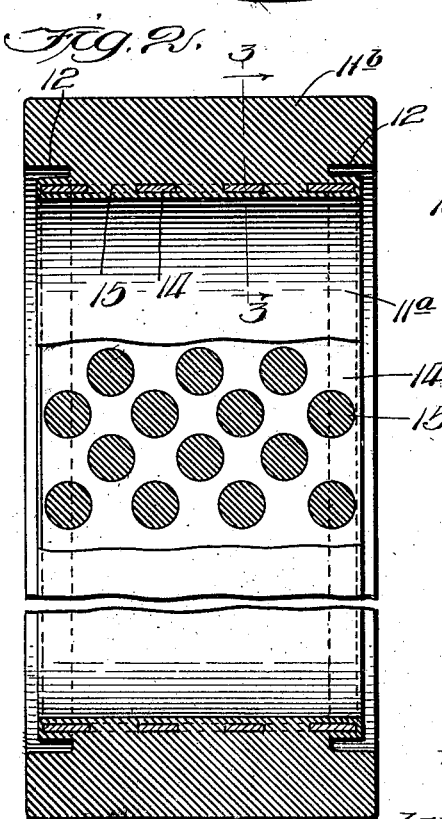
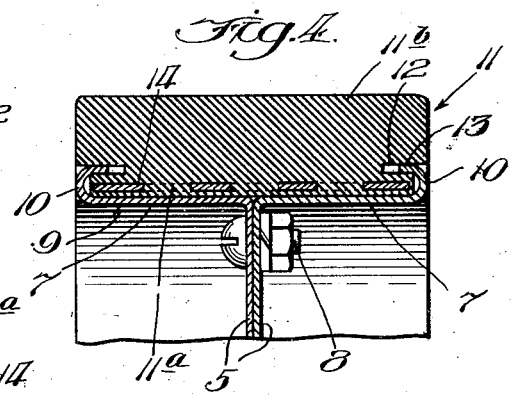
Inventor:
Walter S. Finnell
By Rector, Hibben, Davis & Macauley
Attys Patented July 14, 1931

1,814,623

UNITED STATES PATENT OFFICE

WALTER S. FINNELL, OF ELKHART, INDIANA

RUBBER-TIRED WHEEL

Application filed September 2, 1927. Serial No. 217,058.

My invention relates generally to rubber-tired wheels and has to do particularly with a novel form of separately mounted rubber-tire and the manner of mounting and supporting the same upon the wheel.

One of the objects of my invention is to provide an improved rubber-tire which is exceedingly simple in construction, and which is exceptionally strong, durable and efficient in operation over long periods of time.

Another object is to provide a unitary tire structure which may be readily formed of a soft rubber material so as to not mar the surface over which the wheel may pass, and which is so arranged that it is positively rigidly supported upon the wheel without the use of further attachment means and whereby it will not be accidentally detached. To this end, I employ an integral rubber-tire structure having a thick tread portion with a comparatively thin base part, the base having a perforated metal band molded therein which is of a thickness approaching the thickness of the base and of a width extending throughout the base. This construction in addition to the above adds strength and rigidity to the tire as a whole and provides for the use of a minimum amount of rubber in the base whereby cost of construction and maintenance is greatly reduced.

Still another object is to so form the tire and supporting rim of the wheel so that the tread portion overlies and is partially supported upon the rim, the arrangement being such so that the tread may be worn away to the base and rim part without danger of marring the surface over which the wheel passes. This further adds to the length of the life of the tire.

Other and further objects and advantages will become apparent as this description progresses and by reference to the drawings wherein: —

Figure 1 is a side view of a rubber-tired wheel embodying my invention.

Fig. 2 is an enlarged vertical section through the rubber-tire of Fig. 1, the same being shown removed from the wheel.

Fig. 3 is a partial section taken substantially on line 3—3 of Fig. 2.

Fig. 4 is an enlarged vertical section of a portion of rubber-tired wheel of Fig. 1, taken substantially on line 4—4 of that figure and clearly showing the manner of mounting and supporting the rubber-tire upon the wheel.

Although my invention may be used in varied instances, it is especially adapted for use in connection with wheels employed for supporting and transporting apparatus used in the treatment of fine floor surfaces which may be easily marred, and where it is desirable that marring of such floor surfaces be positively prevented.

With particular reference to the drawings, the wheel is comprised of a pair of identical circular discs 5, each having a centrally cupped portion forming a hub part 6 and a peripheral flange 7. These sections are detachably joined together with the flanges 7 extending in opposite directions by the bolts and nuts 8 and in their assembled position form a wheel rim 9. This sectional construction readily permits of mounting of the rubber-tire as will become obvious hereinafter. The outer edges of the wheel flanges 7 (rim 9) are curved upwardly and then rearwardly as indicated at 10 for the purpose of supporting and retaining the rubber-tire 11 and to eliminate any sharp edges which might come in contact with the tire tread or the surface over which the wheel may pass.

In carrying out my invention I employ a separately mounted rubber tire which has a very thin base part $11^a$ of such width that it extends throughout the width of the wheel rim 9 between the curved ends 10 thereof. A comparatively thick tread part $11^b$, which is integrally formed with the base during the process of molding, is employed. The thickness of this tread part may be varied and I have found that the proportion of thickness shown in the drawings is well adapted for carrying out my purpose but I do not desire to be limited to the dimensions shown as they obviously may be varied without departing from my invention. The tread portion $11^b$ is of greater width than the base portion $11^a$, so as to extend out over the curved ends 10 of the wheel rim 9. In the form shown in the drawings, the outer edges of the base portion are spaced from the adjacent edges of the tread portion to provide grooves 12 which receive the inwardly turned ends 13 of the wheel rim flanges. In this manner, the base 11ª is securely mounted on the wheel rim. Also, this construction permits of use of the tire until the tread wears practically down to the base portion and, in the event that it should wear to an extent where the end of the wheel flanges strike the floor surface, such surface will not be marred due to the curved and flat surface of the wheel rim with which it may contact. Also, the curved end portions of the wheel rim serve to additionally support the adjacent part of the tire tread so that the tread is supported uniformly throughout and the length of life of such portion is materially lengthened.

In forming the thin base 11ª, I employ a comparatively thick metal band 14, which is entirely imbedded therein during the process of molding the tire, such band extending throughout the width of the base and being of a thickness closely approaching that of the base. This metal band is provided with a plurality of substantially spaced and comparatively large perforations 15 which permit of the rubber readily passing through such perforations to, in effect, integrally interlock the rubber and metal parts while, at the same time, not weakening the metal band 14 and lessening its supporting effect. This arrangement provides a strong durable and rigid support for the tread portion and entirely eliminates the possibility of the tire accidentally slipping off the wheel rim. It also permits of the use of a soft rubber material in the formation of the tire, whereby apparatus of considerable weight supported by wheels embodying my invention may be passed over highly polished floor surfaces without marring the same, providing for the use of a thin base portion embodying a very small amount of rubber, waste is eliminated and the cost of the tire and wheel structure as a whole is materially reduced. This is quite an advantage over the tires used heretofore which necessarily employed a considerable amount of rubber in the base part of the tire in order to render the same sufficiently rigid for support upon the wheel, the surplus rubber so used being actually wasted because of serving no useful purpose as far as wearing of the tire and lengthening of life of the same are concerned. It has also been the experience that such former tires very frequently become accidentally displaced from the wheel because of lack of rigidness in itself and lack of rigid support. These objectionable conditions are entirely overcome by my invention.

Although I have shown only one embodiment of my invention, it is to be understood that various changes and modifications may be made therein without departing from the spirit and scope of my invention as defined in the claim which follows.

I claim:

A rubber tire which is adapted to be supported upon an attaching rim of a character which is channel-shaped in cross section with its upper edges turned inwardly substantially horizontal to provide confining channels at the opposite side edges of the rim; which comprises a comparatively thick tread section of rectangular-like shape in cross section and of substantially the same width as the outside dimension of said rim whereby no part of the rim projects laterally beyond said tread portion throughout its entire circumference, a comparatively thin base portion of a normal width substantially equal to the inside dimension of the main rim channel and of a uniform normal thickness substantially equal to the width of said confining channels formed by the inturned rim edges, a perforated metal plate closely approximating the thickness of said base portion molded into said base portion with the rubber on the opposite sides of the plate integrally molded through said plate perforations, said plate extending throughout the width of said base rendering it rigid throughout, a neck portion between said base and tread portion of lesser width than said base portion of a depth substantially equal to the thickness of the metal of the inturned edges of said rim, the relative sizes of said tire portions forming around the tire at each side horizontal grooves into which the inturned rim edges are adapted to extend for confining without distortion said base portion and for supporting said tread portion, whereby the edges of said tread portion, and said base portion, are firmly and uniformly supported.

In testimony whereof, I have subscribed my name.

WALTER S. FINNELL.